United States Patent
Ito et al.

[15] 3,684,767
[45] Aug. 15, 1972

[54] METHOD FOR PREPARING POLYOXYMETHYLENE

[72] Inventors: Akihiko Ito; Masaru Yoshida; Yoshiaki Nakase, all of Takasaki-shi; Tadashi Iwai, Miura-gun, Kanagawa-ken; Koichiro Hayashi, Osaka-fu; Seizo Okamura, Kyoto-shi, all of Japan

[73] Assignee: Japan Atomic Energy Research Institute

[22] Filed: Jan. 6, 1970

[21] Appl. No.: 1,051

[30] Foreign Application Priority Data

Jan. 16, 1969 Japan..................44/3097

[52] U.S. Cl............................260/67 FP, 204/159.21
[51] Int. Cl..............................................C08g 1/00
[58] Field of Search...............260/67 FP; 204/159.21

[56] References Cited

UNITED STATES PATENTS

| | | |
|---|---|---|
| 3,288,756 | 11/1966 | Buckley..................260/67 FP |
| 3,346,663 | 10/1967 | Kern et al..................260/823 |
| 3,385,826 | 5/1968 | Hermann et al........260/67 FP |
| 3,457,226 | 7/1969 | Miyake et al...........260/67 FP |
| 3,525,716 | 8/1970 | Okamura et al........260/67 FP |

OTHER PUBLICATIONS

Hayashi et al., Journal of Polymer Science, Pt B, Vol. 1, No. 8, Aug. 1963, pp. 427– 432.

*Primary Examiner*—William H. Short
*Attorney*—McGlew and Toren

[57] ABSTRACT

Tetraoxane is polymerized in the presence of alkyl acetal, represented by the general formula:

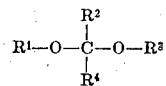

(wherein $R^1$ and $R^3$ are each an aliphatic hydrocarbon residue, having one to four carbon atoms; and $R^2$ and $R^4$ are each hydrogen or an aliphatic hydrocarbon residue, having one to three carbon atoms) to form polyoxymethylene. The polyoxymethylene so made has superior thermal stability and excellent strength and is obtained at a high yield in one step.

7 Claims, No Drawings

METHOD FOR PREPARING POLYOXYMETHYLENE

SUMMARY OF THE INVENTION

This invention relates to an improved method for preparing polyoxymethylene from tetraoxane.

It is well known that polyoxymethylene is prepared by polymerizing formaldehyde or its cyclic trimer, trioxane, or its cyclic tetramer, tetraoxane. But polyoxymethylene thus prepared has inferior chemical and thermal stabilities, and is liable to be depolymerized into formaldehyde. In order to use it as a plastic material for industrial purposes, it has therefore to be subjected to stabilizing treatment, for which a known method is, for example, the acetylation of the ends of polyoxymethylene molecules with acetic anhydride. Another method known for preparing the stabilized polyoxymethylene consists in polymerizing formaldehyde or trioxane or tetraoxane in the presence of a copolymerizable second component. The copolymer thus prepared has a superior thermal stability because of the introduction into its molecules of other bonding chains than those of oxymethylene. Such a copolymer, however, is disadvantageous in mechanical strength compared to a homopolymer having only oxymethylene chains.

A still further method for preparing polyoxymethylene of high thermal stability has been proposed as solution polymerization of trioxane in the presence of alkyl acetal as a chain transfer agent, using a cationic catalyst (cf. V. Jaacks, H. Baader & W. Kern: Makromolekulare Chemie, Vol. 83, p. 56, 1965). This method is handicapped by a low polymer yield and also by a low molecular weight of the product. In order to control the molecular weight of polyoxymethylene, it has been proposed that a molten trioxane may be polymerized at a temperature between 45° and 115°C in the presence of a small amount of methylal, but no mention has been made with respect to the thermal stabilization of the polymer. As a method in which tetraoxane is copolymerized with a second component, the only method known is one wherein isocyanate or cyclic ether is used as the second component.

It is an object of the invention to provide an improved method for preparing polyoxymethylene by polymerizing tetraoxane, which is free of the above mentioned shortcomings. Another object of the invention, is to provide a method for easily preparing polyoxymethylene having superior thermal stability and excellent mechanical strength. Finally, it is an object of the invention to provide a method for preparing polyoxymethylene, having the above-mentioned properties, in one step and at a high yield.

The above-mentioned objects of the invention can be achieved by polymerizing tetraoxane in the presence of an alkyl acetal, represented by the general formula:

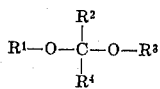

wherein $R^1$ and $R^3$ are each an aliphatic hydrocarbon residue, having one to four carbon atoms; and $R^2$ and $R^4$ are each selected from the group consisting of hydrogen and an aliphatic hydrocarbon residue, having one to three carbon atoms, to form polyoxymethylene.

The method of the invention is applicable, in particular, to the polymerization of tetraoxane which is a cyclic tetramer of formaldehyde; and alkyl acetal, represented by the above-mentioned formula, is exemplified by dimethoxymethane (methylal), diethoxymethane (ethylal), 1,1-dimethoxyethane, 1,1-diethoxyethane, 1,1-diethoxypropane, dipropoxymethane, dibutoxymethane, methoxybutoxymethane, 1,1-dibutoxypropane, 1,1-diethoxybutane, and 2,2-dimethoxypropane. The amount of alkyl acetal to be added is from 0.0001 to 10 percent by weight, or preferably, from 0.05 to 3 percent by weight based on tetraoxane. As a method of polymerization according to the present invention, the known method in which, for instance, the reaction system is subjected to ionizing radiation or performed with addition of some cationic catalysts, may be employed. In some cases, a hydrocarbon halide may be added to the reaction system as a polymerization initiator.

To give a more detailed description of the invention, in the case of the application of ionizing radiation, tetraoxane crystals are subjected to the irradiation after a suitable amount of alkyl acetal has been added in liquid, mist, or gaseous state. Such irradiation may be carried out to give a good result to the polymerization reaction after the mixture of the tetraoxane crystals and alkyl acetal has been allowed to stand for a certain period of time, which is not particularly limited but preferably in the range of from 20 to 200 hours. It may be varied according to the kind of the alkyl acetal used and also the degree of agitation.

In the case of the in-source polymerization, both the irradiation temperature and the polymerization temperature are preferably in the range of from 70° to 112°C. In the case of the post-polymerization, the irradiation temperature is so adjusted that the tetraoxane is kept in the solid state, conveniently this is about room temperature; while the polymerization temperature is maintained between 80° and 112°C, (112°C being the melting point of tetraoxane). When in-source polymerization is carried out, it can take place during the irradiation, if in that case the irradiation temperature is above 60°C. The ionizing radiation used for that purpose is exemplified by α-rays, β-rays, γ-rays, electron beams, X-rays, beams of neutrons, heavy particles, and nuclear fission fragments, the dosage being usually in the range of from $1 \times 10^2$ to $1 \times 10^9$ rad. In the case of the in-source polymerization, the dose rate in the range of from $1 \times 10^2$ to $1 \times 10^9$ rad per hour is applicable.

When the polymerization is carried out in the presence of a polymerization initiator, tetraoxane crystals are admixed with alkyl acetal and a suitable polymerization initiator in liquid, mist, or gaseous state and polymerized in a hot bath at the desired temperature. In that case, the mixture is not necessarily allowed to stand prior to polymerization. To the polymerization initiator may be added a suitable amount of an inert solvent, such as cyclohexane or benzene. By so doing, the initiator in an amount as low as less than 1 percent by weight of the tetraoxane can be dispersed uniformly in the polymerization system. As the polymerization initiator, well-known cationic polymerizing may be used, such as Lewis acid ($SbF_3$, $BF_3$, $AlF_3$, $AlCl_3$, and $FeCl_3$), and its organic coordination complex with alcohol, phenol, ether, acid, or acid anhydride, and Broensted acids, such as sulfuric acid and para-toluene sulfonic acid. Hydrocarbon halides as disclosed in U.S. Pat. application Ser. No. 867,933, filed Oct. 20, 1969 for example, methylene chloride, bromoform, methyl iodide, and ethyl iodide can also be used. The amount of the polymerization initiator used varies according to its kind, but generally, it is in the range of from 0.0001 to 10 percent by weight based on tetraoxane. Such polymerization may be usually conducted at a temperature in the range of from 10° to 140°C.

Polymerization of the tetraoxane can be carried out in the liquid state, in which the system containing tetraoxane is in the molten state, or in a solution of a solvent, inert to formaldehyde, such as cyclohexane, diethyl ether or nitrobenzene; or in the state of suspension, when tetraoxane is suspended in the above-mentioned solvent; or tetraoxane may be in the solid state, which is maintained even with the addition of such liquids as a polymerization initiator, an alkyl acetal and an inert solvent. Of these three polymerization methods polymerization in the solid state is preferable in order to give a product having the highest thermal stability.

Polymerization can also be effected by the combined use of the above-mentioned radiation-induced method and initiator-using method. Particularly, the hydrocarbon halide is an excellent initiator for the combined use due to synergism. The combined use brings about not only reduction in the amount of initiator, dose of ionizing radiation and/or polymerization time, but also improvement of the thermal stability and adjustment of the molecular weight of the polyoxymethylene product.

The polymerization of tetraoxane in this case is induced in the presence of at least one polymerization initiator and by subjecting the tetraoxane to ionizing radiation. More particularly, the tetraoxane is subjected to ionizing radiation at a dose rate of from $10^2$ to $10^7$ rad per hour and, at the same time, at a temperature of from 70° to 140°C; or the tetraoxane is subjected to ionizing radiation at a dosage of from $10^2$ to $10^7$ rad and then polymerized at a temperature of from 80° to 112°C. In case the initiator used is a hydrocarbon halide, its amount is from 0.0001 to 1 percent by weight of the tetraoxane.

There is no limitation to the atmosphere in which the polymerization is conducted; the polymerization may be carried out in vacuo, in air, or in an inert gas. The polymerization in vacuo is advantageous in that additives, such as alkyl acetal, may be well dispersed.

The following are some examples in which the present invention will be further illustrated, but they are not to be construed as limiting the scope of the invention. In the examples, the intrinsic viscosity of polyoxymethylene is determined at 60°C in a 0.5 percent solution of p-chlorophenol containing 2 percent of α-pinene, and the average thermal decomposition rate, $K_{222}$ (%/min.), is measured in a nitrogen atmosphere at 222°C for 1 hour. The percentages mentioned in the examples are all percentages by weight.

EXAMPLE 1.

In a glass ampoule in which 1 g of tetraoxane was placed, 3 percent of dimethoxymethane (methylal) (based on the tetraoxane) was directly added and sealed off. The mixture in the ampoule, after being allowed to stand at room temperature for 150 hours, was irradiated at the same temperature by γ-rays from a cobalt 60 radiation source, as given in Table 1, followed by polymerization at 105°C for 1 hour. Then, unreacted compoments and methylal were extracted by acetone from the polymerization product, and the crystalline polymer was dried under reduced pressure at room temperature; the results given in Table 1 (as "Example" were obtained.

Similar experiments were conducted for the purpose of control, with the only exception that methylal was not used; obtained results are given in the same table (as "Control").

COMPARATIVE EXAMPLE.

To 1 g of trioxane in a glass ampoule 3 percent of methylal were directly added and sealed off. After being allowed to stand at room temperature for 150 hours, the mixture in the ampoule, was irradiated ($1 \times 10^6$ rad) at room temperature by γ-rays from a cobalt 60 radiation source, followed by polymerization at 55°C for 1 hour. Then, unreacted components were extracted from the polymerization product by acetone, and the crystalline polymer was dried under reduced pressure at room temperature; obtained was a polymer with $[\nu] = 0.7$ and $K_{222} = 0.60$ (%/min.), at the yield of 14 percent.

TABLE 1.

| | Polymerization conditions | | Results | | |
|---|---|---|---|---|---|
| | Dosage of γ-rays (rad) | Amount of methylal added (%) | Properties of polymer prepared [η] | $K_{222}$ (%/min) | Yield of polymer (%) |
| Example | $1 \times 10^6$ | 3 | 1.3 | 0.50 | 20 |
| | $5 \times 10^4$ | 3 | 2.0 | 0.50 | 20 |
| Control | $1 \times 10^6$ | 0 | 1.3 | 1.33 | 47 |
| | $5 \times 10^4$ | 0 | 2.9 | 1.25 | 30 |

EXAMPLE 2.

To 1 g of tetraoxane, purified by sublimation 3 percent (based on the tetraoxane) of methylal were added. After being allowed to stand at room temperature for 24 hours, the mixture was heated to 95°C and irradiated by γ-rays from a cobalt 60 radiation source, as given in Table 2, for 1 hour for polymerization. Then, unreacted components were removed and the crystalline polymer was dried as in Example 1, the results given in Table 2 (as "Example") were obtained. Similar experiments were conducted for the purpose of control, in which the only exception was that no methylal was used; obtained were the results given in the table (as "Control").

TABLE 2.

| Polymerization conditions | | Results | | |
|---|---|---|---|---|
| Dosage of γ-rays (rad) | Amount of methylal added (%) | Properties of polymer prepared [η] | $K_{222}$ (%/min) | Yield of polymer (%) |
| $1 \times 10^6$ | 3 | 0.3 | 0.67 | 98 |

| Example | | | | | |
|---|---|---|---|---|---|
| | $1 \times 10^5$ | 3 | 0.9 | 0.75 | 77 |
| | $1 \times 10^6$ | 0 | 0.5 | 0.91 | 99 |
| Control | | | | | |
| | $1 \times 10^5$ | 0 | 1.3 | 1.17 | 84 |

EXAMPLE 3.

To 10 g of tetraoxane, purified by sublimation, any one combination of alkyl acetal and alkyl halide was added in quantities (based on the tetraoxane) given in Table 3; the mixture, after being allowed to stand at room temperature for 1 hour, was heated to 105°C and then subjected to polymerization reaction for the respective periods of time shown in Table 3 (as "-Polymerization time"). After unreacted components had been extracted and removed by acetone, the polymerization product was dried under reduced pressure for 24 hours, yielding the results given in Table 3.

COMPARATIVE EXAMPLE.

To 1 g of trioxane in a glass ampoule 3 percent of methylal and 1 percent of methyl iodide were directly added and sealed off. The mixture, was allowed to stand at room temperature for 1 hour, heated at 55°C to polymerize for 1 hour and then another for 24 hours. After unreacted components had been extracted by acetone, the remaining polymer was less than 1 percent in yield in both cases.

with $[\nu] = 1.6$ and $K_{222} = 0.20$ (%/min.) at the yield of 90 percent. When a similar experiment was conducted without 3 percent of methylal, the polymer with the same $[\nu]$ and yield as the above was obtained, but $K_{222} = 1.10$ (%/min.).

EXAMPLE 6.

To 1 g of tetraoxane, purified by sublimation, 1 percent of methylal and 4 percent (both based on tetraoxane) of methyl iodide were added, and the mixture, after being allowed to stand at room temperature for 30 minutes, was subjected to polymerization for 1 hour at any one of the temperatures given in Table 4. After unreacted components had been removed, as in Example 4, the products were dried, yielding the results given in Table 4.

TABLE 4.

| Polymerization temperature (°C) | $[\eta]$ | $K_{222}$ (%/min) | Yield (%) |
|---|---|---|---|
| 90 | 1.8 | 0.25 | 15 |
| 105 | 1.1 | 0.20 | 88 |
| 110 | 0.9 | 0.10 | 85 |
| 115 | 0.9 | 0.10 | 85 |
| 125 | 0.7 | 0.15 | 90 |

TABLE 3

| Polymerization conditions | | Results | | |
|---|---|---|---|---|
| Amount of alkyl acetal added (percent) | Amount of alkyl halide added (percent) | Polymerization time (min.) | Properties of polymer prepared | | Yield of polymer (percent) |
| | | | $[\eta]$ | $K_{222}$ (percent/min.) | |
| Methylal (0.2) | Methyl iodide (7) | 60 | 1.6 | 0.40 | 86 |
| Methylal (0.5) | do | 60 | 1.8 | 0.13 | 96 |
| Methylal (3.0) | do | 60 | 0.3 | 0.24 | 90 |
| Methylal (0.2) | Methyl iodide (1) | 60 | 2.7 | 0.60 | 39 |
| Methylal (0.5) | Methyl iodide (0.5) | 60 | 1.3 | 0.60 | 30 |
| Methylal (0.1) | Ethyl iodide (7) | 60 | 1.3 | 0.26 | 80 |
| Ethylal (1.0) | Methyl iodide (4) | 20 | 1.0 | 0.16 | 60 |
| 1,1-dimethoxy ethane (1.0) | do | 20 | 0.8 | 0.15 | 73 |
| 1,1-diethoxy ethane (1.0) | do | 20 | 0.7 | 0.15 | 55 |

EXAMPLE 4.

To 10 g of tetraoxane, purified by sublimation, 0.2 percent of methylal and 1 percent of methyl iodide, were added and the mixture, after being allowed to stand at room temperature for 1 hour, was irradiated for 1 hour by $5 \times 10^4$ rad of $\gamma$-rays from a cobalt 60 radiation source, and then heated at 105°C for 1 hour for polymerization. After unreacted components had been extracted by acetone, the polymerization product was dried under reduced pressure for 24 hours, obtained was a crystalline polymer, with $[\nu] = 1.8$ and $K_{222} = 0.45$ (%/min.), at the yield of 85 percent.

EXAMPLE 5.

To 1 g of tetraoxane, purified by sublimation, in a glass ampoule 1 percent of methylal and 0.5 percent of methyl iodide were added, and sealed off under reduced pressure. The mixture was irradiated for 1 hour by $1 \times 10^5$ rad/hour of $\gamma$-rays from a cobalt 60 radiation source to polymerize at 105°C. After the polymerization, the same treatment as in Example 4 was applied. A white crystalline polymer was obtained

EXAMPLE 7.

To 1 g of tetraoxane, purified by sublimation, 1.5 percent of methylal, was added and the mixture was heated to 120°C to obtain a melt. Into the melt, 4 percent (based on tetraoxane) of gaseous methyl iodide was introduced at 120°C and the system was allowed to stand for 20 minutes. As a result, the transparent melt became white, and polymerization proceeded. Subsequently, unreacted components were removed as in Example 4, and the product was dried, obtained was a crystalline polymer, $[\nu] = 0.7$ and $K_{222} = 0.20$ (%/min.), at the yield of 80 percent.

EXAMPLE 8.

To 1 g of tetraoxane, purified by sublimation, 1 percent of methylal and 0.5 percent of methyl iodide were added in a glass ampoule with a part separated by a break seal, and sealed off. The tetraoxane and the methylal were melted and mixed at 120°C, while the methyl iodide was held in the separated part of the ampoule. After breaking the seal to introduce the methyl iodide into the melt, the mixture in the ampoule was subjected to the radiation ($1 \times 10^5$ rad/hour) of $\gamma$-rays from a cobalt 60 radiation source allowing the mixture to polymerize at 120°C for 1 hour. Subsequently, the same treatment was applied after the polymerization as in example 4. A white crystalline polymer was obtained with $[\nu] = 0.9$ and $K_{222} = 0.20$ (%/min.) at the yield of 85 percent.

When a similar experiment was conducted without 1 percent of methylal, the polymer was obtained with the same $[\nu]$ and yield as above-mentioned, but $K_{222} = 1.10$ (%/min.).

EXAMPLE 9.

To 1 g of tetraoxane, purified by sublimation, 3 percent of methylal and 2 percent of boron trifluoride ethyl ether (both based on tetraoxane) were added. The mixture was then heated to 105°C so that the mixture was polymerized for 1 hour. After the polymerization was completed, the product was washed with acetone, containing 1 percent of ammonia, and then dried under reduced pressure, obtained was a polymer, with $[\nu] = 0.8$ and $K_{222} = 0.90$ (%/min.), at the yield of 83 percent.

EXAMPLE 10.

Tetraoxane, recrystalized from ether, was dispersed into 1 ml of cyclohexane, containing 3 percent of methylal, (based on tetraoxane) to which was added 1 percent of boron trifluoride ethyl ether, (also based on tetraoxane) and immediately thereafter the temperature was raised to 70°C, and polymerization was conducted for 30 minutes. Subsequently, the contents of the system were washed and dried as in Example 9, obtained was a polymer, with $[\nu] = 1.0$ and $K_{222} = 0.85$ (%/min.), at the yield of 42 percent.

When a similar experiment was conducted in which the only exception was the use of 4 percent of methyl iodide instead of 1 percent of boron trifluoride ethyl ether, (both based on tetraoxane) a polymer with $[\nu] = 0.8$ and $K_{222} = 0.20$ (%/min.) was obtained at the yield of 20 percent.

EXAMPLE 11.

To 5 g of tetraoxane, purified by sublimation, 4 percent (based on tetraoxane) of a liquid mixture were added consisting of 1 part of methylal, 2 parts of benzene and 5 parts of methyl iodide, and the resulting mixture was heated at 105°C to allow polymerization for 1 hour. When unreacted components were removed and the contents of the polymerization system were dried as in Example 4, a polymer, with $[\nu] = 1.2$ and $K_{222} = 0.20$ (%/min.) was obtained at the yield of 93 percent.

EXAMPLE 12.

1 of tetraoxane was dissolved in 1 ml of nitrobenzene, and while the temperature was kept at 105°C, 3 percent of methylal and 1 percent of boron trifluoride, both based on tetraoxane and both being in gaseous state, were introduced into the solution to allow polymerization to proceed for 30 minutes. Subsequently, the polymerization product was made to flow into acetone, containing 1 percent of ammonia, in order to remove unreacted components, and then dried under reduced pressure, whereby a polymer, with $[\nu] = 0.4$ and $K_{222} = 0.93$ (%/min.), at the yield of 90 percent was obtained.

What is claimed is:

1. A method of preparing polyoxymethylene having a high thermal stability, which comprises polymerizing tetraoxane in the presence of
    a. from 0.0001 to 10 percent by weight of the tetraoxane, of an alkyl acetal, represented by the general formula:

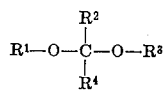

wherein $R^1$ and $R^3$ are each a saturated aliphatic hydrocarbon, having one to four carbon atoms, and $R^2$ and $R^4$ are each selected from the group consisting of hydrogen and a saturated aliphatic hydrocarbon, having one to three carbon atoms, and
    b. a hydrocarbon halide selected from the group consisting of methylene chloride, bromoform, methyl iodide, and ethyl iodide as polymerization initiator.

2. The method according to claim 1, wherein the amount of said hydrocarbon halide is from 0.0001 to 10 percent by weight of the tetraoxane.

3. The method according to claim 1, wherein the tetraoxane in the liquid state is polymerized at a temperature not exceeding 140°C.

4. The method according to claim 1, wherein the tetraoxane in the solid state is polymerized at a temperature above 10°C.

5. The method according to claim 1, wherein said polymerization of tetraoxane is additionally induced by subjecting the tetraoxane to ionizing radiation.

6. The method according to claim 5, wherein said tetraoxane is polymerized by subjecting same to ionizing radiation at a dose rate of from $10^2$ to $10^7$ rad/hour and at a temperature of from 70° to 140°C.

7. The method according to claim 5, wherein said tetraoxane is subjected to ionizing radiation at a dosage of from $10^2$ to $10^7$ rad, and then polymerized at a temperature of from 80° to 112°C.

* * * * *